(12) United States Patent
Arts et al.

(10) Patent No.: US 10,155,849 B2
(45) Date of Patent: Dec. 18, 2018

(54) HYPERBRANCHED POLYMERS

(71) Applicant: DSM IP ASSETS B.V., Heerlen (NL)

(72) Inventors: Henricus Johannes Arts, Echt (NL); Thomas Dikken, Echt (NL); Remco Dinkelberg, Echt (NL)

(73) Assignee: DSM IP ASSETS B.V., Heerlen (NL)

(*) Notice: Subject to any disclaimer, the term of this patent is extended or adjusted under 35 U.S.C. 154(b) by 328 days.

(21) Appl. No.: 14/899,707

(22) PCT Filed: Jun. 20, 2014

(86) PCT No.: PCT/EP2014/063031
§ 371 (c)(1),
(2) Date: Dec. 18, 2015

(87) PCT Pub. No.: WO2014/202756
PCT Pub. Date: Dec. 24, 2014

(65) Prior Publication Data
US 2016/0137784 A1    May 19, 2016

(30) Foreign Application Priority Data
Jun. 20, 2013  (EP) ................... 13173082

(51) Int. Cl.
| C08G 69/44 | (2006.01) |
| C08G 69/48 | (2006.01) |
| C08G 83/00 | (2006.01) |
| C08L 77/12 | (2006.01) |
| C02F 1/56 | (2006.01) |
| C02F 103/00 | (2006.01) |
| C02F 103/28 | (2006.01) |

(52) U.S. Cl.
CPC ............ C08G 69/44 (2013.01); C02F 1/56 (2013.01); C08G 69/48 (2013.01); C08G 83/006 (2013.01); C08L 77/12 (2013.01); *C02F 2103/002* (2013.01); *C02F 2103/28* (2013.01)

(58) Field of Classification Search
None
See application file for complete search history.

(56) References Cited

U.S. PATENT DOCUMENTS 6,784,267 B1 * 8/2004 Ward ............... C08F 220/34
210/733

FOREIGN PATENT DOCUMENTS

| WO | WO-2009153334 A1 * | 12/2009 | ............ A61K 8/85 |
| WO | WO 2011/057225 | 5/2011 | |
| WO | WO-2011057225 A2 * | 5/2011 | ........... A61K 9/5153 |

OTHER PUBLICATIONS

International Search Report for PCT/EP2014/063031, dated Aug. 14, 2014, three pages.
Kelland, "Tuning the Thermoresponsive Properties of Hyperbranched Poly(ester amide)s Based on Diisopropanolamine and Cyclic Dicarboxylic Anhydrides," Journal of Applied Polymer Science, vol. 121, 2282-2290 (2011).

* cited by examiner

*Primary Examiner* — Clare M Perrin
(74) *Attorney, Agent, or Firm* — Nixon & Vanderhye P.C.

(57) ABSTRACT

There is disclosed certain hyperbranched polyester amides with end groups selected from: esters or amides of betaine-type end groups useful in various end uses such as a flocculent.

15 Claims, No Drawings

HYPERBRANCHED POLYMERS

This application is the U.S. national phase of International Application No. PCT/EP2014/063031 filed 20 Jun. 2014 which designated the U.S. and claims priority to EP Patent Application No. 13173082.2 filed 20 Jun. 2013, the entire contents of each of which are hereby incorporated by reference.

The present invention relates to the field of polyester amides with improved properties preferably suitable for use in one or more of certain end uses and/or applications as described herein. In a particularly preferred embodiment of the present invention the polyester amides are hyperbranched.

In many types of industrial and/or domestic processes or applications polymeric materials are used that must remain in solution at elevated temperatures and/or in the presence of salts. Examples of such materials include flocculants used in paper production and dishwater detergents.

Water soluble polymers typically used in these applications are block copolymers of polyethylene glycol and polypropylene glycol, polyethoxylated alkylphenols, ethoxylated alkylphenol-formaldehyde resins, poly vinyl alcohol derivatives and cationic or anionic polyelectrolytes.

However these water soluble polymers have certain disadvantages. They can be non-biodegradable, which hinders their use in certain areas such as wastewater treatment. A disadvantage of some phenolic polymers is their suspected interference with the human endocrine system. Other water soluble polymers are toxic against water organisms. Therefore there is a need for water soluble polymers that remain soluble at high temperature and/or high salt concentrations and don't have some or all of the disadvantages described herein.

Hyperbranched polyester amides are available commercially from DSM under the registered trade mark Hybrane® in a variety of different types that comprise different functional groups. Whilst many generic types of such hyperbranched polymers exist, they are not all suitable for all applications. It would be desirable to find hyperbranched polymers which are particularly suitable for some or all of the applications described herein.

Currently used hyperbranched polymers have a low cloud point and when experiencing high temperatures it has been found that such materials when added to liquid media (such as in aqueous dispersions) can show phase separation above their cloud point, resulting in sticky deposits and lower concentrations which are thus less effective in their end use even if they can be re-dissolved completely on cooling. Therefore it would be desirable to provide hyperbranched polymers with higher cloud points than those presently available. It has also surprisingly been found that the presence of certain salts in the mixture also has a large influence in lowering the cloud point with sulphate and carbonate ions having a significant influence.

Malcolm A. Kelland (J. App. Poly. Sci. 15 Aug. 2011 pp 2282-2290) reports preparing a certain hyperbranched polyester amides from diisopropanol amine and cyclic dicarboxylic anhydrides to study their lower critical solution temperatures (LCST) in water (measured as an optical cloud point). Kelland concludes that 'polyester amides with low LCST are of interest for biological and medical applications whereas polyester amides with a high LCST values may be useful . . . for high salinity produced fluids . . . .'

Despite this general statement the Kelland paper does not provide many details about which specific cloud point values may be useful in practise for which end uses of polyester amides and describes synthesis of only a few types of polyester amides which are then tested for only a limited number of end uses. So the conclusions in Kelland can be considered tentative and too vague to be of much practical assistance in developing or optimising polyester amide products for new and existing end uses. Kelland does not describe or prepare any polyester amide that contains betaine (or similar) functional groups such as those described herein.

It is a preferred object of the invention to solve some or all of the problems identified herein and to provide improved polyester amides optimised for different uses as well as improved methods of preparing them.

Surprisingly the applicant has discovered that certain hyperbranched polyester amides having a cloud point value above a minimum value (as tested under the conditions defined herein) are especially useful in one or more of the end uses described herein (also referred to herein collectively as END USES), for example use as a flocculent.

Therefore broadly in accordance with the present invention there is provided a hyperbranched polyester amide (optionally having a cloud point of at least one of the values described herein (such as at least 50° C.)) where the polyester amide comprises at least one ester and/or amide of an optionally neutral end group comprising a positively charged cationic moiety preferably an onium ion (more preferably a quaternary ammonium or phosphonium cation) which bears no hydrogen atom optionally covalently attached to a negatively charged moiety such as a carboxylate group which may not be adjacent to the cationic site.

The hyperbranched polyester amide of the invention comprises at least one end group thereon selected from the end groups (also denoted herein as 'betaine-type ester' groups and/or betaine ester derivatives) represented by the Formula 1:

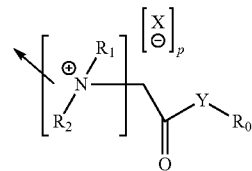

Formula 1 where the arrow denotes the point of attachment to the polyester amide from the Formula 1 group for example from the nitrogen cation, to the polyester amide; and $R_0$ denotes optionally substituted $C_{1-20}$hydrocarbo, Y denotes $NR_a$ or O where $R_a$ is H or optionally substituted $C_{1-20}$hydrocarbo $R_0$ is selected from optionally substituted $C_{1-20}$hydrocarbo optionally substituted by one or more hetero atom, optionally preferably one or more N or O and where Formula 1 is a zwitterion i.e. any of groups $R_0$, $R_1$ and/or $R_2$ comprise a suitable amount of negative charge to balance the nitrogen cation then p is 0 i.e. X— is absent; or where groups $R_0$, $R_1$ and $R_2$ are neutral groups then X⁻ represents a suitable anion and p a suitable integer (preferably 1 if X has a single negative charge) to balance the nitrogen cation; and $R_1$ and $R_2$ independently denote optionally substituted $C_{1-20}$hydrocarbo groups (conveniently optionally substituted $C_{1-6}$hydrocarbo), or together with the nitrogen to which they are attached form in a whole or in part a cyclic moiety comprising up to 20 C atoms and optionally one or more hetero atoms.

Usefully $R_1$ and $R_2$ independently comprise optionally substituted $C_{1-4}$hydrocarbyl groups, more preferably are both methyl (in which case Formula 1 represents a hydrocarbo ester or amide of a monovalent diimethylglycinyl group, also referred to herein as a 'betaine hydrocarbo ester derivative').

In the alternative where $R_1$ and $R_2$ may together form (part of) a ring together they may denote optionally substituted $C_{1-6}$hydrocarbylene and thus together with the nitrogen cation to which they are attached comprise a ring. It will also be appreciated where $R_1$ and $R_2$ comprise a ring the arrow in Formula 1 may be located at any suitable point on that ring i.e. the moiety of Formula 1 may be attached to the polyester amide through any atom on that ring. It will also be appreciated that any two of $R_0$, $R_1$ and/or $R_2$ (for example $R_1$ and $R_o$ or $R_2$ and $R_0$) may together form a ring in whole or in part (optionally comprising one or more hetero atoms such as N, O and/or S) and such embodiments are also encompassed by the general scope of Formula 1.

The advantages of having ester end groups over their non-ester group equivalents may include that the esters are generally liquid rather than solid and are easier to transport and also during preparation of the ester less salt is produced as a by-product.

Usefully the hyperbranched polyester amides of the invention (especially if they also contain cationic groups) may also comprise one or more anionic carboxylate counter ion(s) (such as $X^-$ in Formula 1) obtained and/or obtainable from at least one organic (mono or poly) carboxylic acid. Usefully $X^-$ represents one or more carboxylate anion.

Preferred counter anions may be derived from organic carboxylic acids comprising:
$C_{6-22}$ linear carboxylic acids and acid salts thereof, more preferably $C_{6-20}$ mono-unsaturated, di unsaturated or saturated acids and acid salts thereof; even more preferably $C_{6-18}$ mono unsaturated or saturated acids and acid salts thereof; most preferably selected from: citric acid [HOC(CH$_2$COOH)$_2$COOH], acid salts of citric acid (such as choline dihydrogen citrate[2-(Hydroxyethyl)trimethylammonium citrate,]) gluconic acid [HOCH$_2$(CHOH)$_4$COOH], oleic acid [n-octadecan-9-enoic acid] and/or linoleic acid [n-octadecan-9,12-dienoic acid]; for example citric acid and acid salts thereof, citric acid being especially preferred.

In accordance with another aspect, one embodiment of the present invention there is provided a process for preparing a hyperbranched polyester amide of the invention (optionally having a cloud point of at least one of the values described herein (such as at least 50° C.)) the process comprising the steps of
 a) dispersing (preferably dissolving) reactants in a non-aqueous solvent;
 b) reacting the reactants thereto to obtain a hyperbranched polyester amide according to the invention dispersed (preferably dissolved) in the non-aqueous solvent.

Dispersing denotes both where a material is mixed with a carrier fluid and is deposed substantially homogenously therein on a macro scale but may be heterogeneous on a microscopic scale forming two or more phases e.g. as small solid particles and/or micelles located throughout the mixture (such as a colloid or emulsion) and/or also where the material is dissolved in the carrier fluid forming a single phase and where e.g. the dissolved material (solute) is not visible to the naked eye and/or collectable by filtration.

Another aspect of one embodiment of the present invention provides for a dispersion (preferably a solution) of a hyperbranched polyester amide according to the invention in a non-aqueous solvent (optionally obtained and/or obtainable by a process of the present invention), where the polyester amide comprises at least one end group comprising a positively charged cationic moiety which bears no hydrogen atom covalently attached to a negatively charged moiety which may not be adjacent to the cationic site.

Preferred neutral end groups comprise quaternary ammonium zwitterionic end groups, i.e. comprising zwitterions that have an anionic group (preferably carboxylate) attached to a positively charged nitrogen atom.

In one embodiment of the present invention the hyperbranched polyester amides of the invention may be obtained and/or obtainable from a process performed in a non-aqueous solvent.

Suitable non-aqueous solvents may comprise any solvent which will dissolve the functional hyperbranched polyester amides of the invention. Usefully suitable solvents will substantially completely evaporate under standard conditions.

In one embodiment of the invention the solvent may be selected from those solvents having a hydrophilic-lipophilic balance (HLB) of more than 5, more preferably more than 9, even more preferably more than 10, most preferably more than 12, for example >=15. The value for HLB (which is a dimensionless number on a scale of from 0 to 20) is calculated from the equation HLB=20×$M_h$/M, where $M_h$ is the molecular mass of the hydrophilic portion of the solvent, and M is the molecular mass of the whole solvent and a lower HLB value indicates a more hydrophobic solvent.

Another advantage of using solvent is the ability to include other components of a formulation.

Suitable non-aqueous solvents may comprise any solvent which will dissolve the functional hyperbranched polyester amides of the invention and enable the solution to be diluted in another solvent or in water or enable the solution to be used in an aqueous environment. Preferably the other solvent is water. Optionally the solvent is miscible with water.

Specific non-aqueous solvents may be selected from the group consisting of:
aliphatic alcohols, non protic polar solvents (DMSO, ethers such as THF), alkylene glycols (e.g. propylene glycol and/or ethylene glycol) and/or suitable mixtures thereof. Preferred non-aqueous solvents are selected from propylene glycol and/or ethylene glycol; for example ethylene glycol.

In another embodiment of the invention hyperbranched polyester amides of the present invention may also be obtained and/or obtainable from an acid and/or aqueous acid mixture comprising at least 10%, preferably at least 15%, more preferably at least 20% by weight of any organic carboxylic acid(s) and/or mixtures thereof (e.g. any as described above) which may provide some or all of the counter anions to the cationic functional groups thereon.

Usefully the hyperbranched polyester amides of the invention (especially if they also contain other cationic groups) may also comprise one or more anionic carboxylate counter ion(s) obtained and/or obtainable from at least one organic (mono or poly) carboxylic acid (including acidic and/or hydrogen salts thereof). Preferred counter anions may be derived from organic carboxylic acids comprising: $C_{1-22}$ linear carboxylic acids and acid salts thereof, more preferably $C_{1-20}$ mono unsaturated, di unsaturated or saturated acids and acid salts thereof; even more preferably $C_{1-18}$ mono unsaturated or saturated acids and acid salts thereof; most preferably selected from: citric acid [HOC (CH2COOH)2COOH], acid salts of citric acid (such as choline dihydrogen citrate[2 (Hydroxyethyl)trimethylammonium citrate]), gluconic acid [HOCH2(CHOH)4COOH], oleic acid [n octadecan 9 enoic acid] and/or linoleic acid [n octadecan 9,12 dienoic acid]; for example citric acid and acid salts thereof, citric acid being especially preferred.

As used herein (unless the context clearly indicates otherwise) the term organic carboxylic acid encompasses organic acids having one or a plurality of carboxy groups (COOH thereon) and all acid salts obtainable by partial neutralization of polyprotic carboxylic acids.

In accordance with another aspect of the present invention there is provided use as a flocculent of a hyperbranched polyester amide according to the invention as described herein.

In accordance with yet another aspect of the present invention there is provided a method of flocculating a material dispersed in an aqueous medium comprising the steps of: providing an material dispersed in an aqueous medium and adding thereto a sufficient amounts of one or more of the hyperbranched polyester amide(s) of the invention as described herein and/or a composition comprising a hyperbranched polyester amide of the invention to cause the material dispersed in said medium to flocculate.

Hyperbranched polyester amides of the present invention have a cloud point of at least 50° C., conveniently at least 55° C., preferably at least 60° C., more preferably at least 80° C., most preferably at least 90° C., in particular at least 100° C. as measured in one or more of the tests described herein in demineralised water (DMW) and/or in salt solution (such as that described herein as BRINE). Brine is defined as an aqueous solutions of various types of salts. Types and concentration of the salts may vary and can be different in different end uses. in. Conveniently polyester amides of the present invention have a cloud value of at least one of the previously described values in at least one of DMW and BRINE, more conveniently in BRINE, most conveniently in both DMW and BRINE.

Where the polyester amides of the invention are hyperbranched polymers they may be prepared by the methods described in one or more of the publications below (and combinations thereof) and/or have structures as described thereto. The contents of these documents are incorporated by reference. It will be appreciated that the core structure of the polyester amide can be formed as described in any of the known ways described on the documents below that are otherwise consisted with the invention herein. The present invention relates to novel and improved polyester amides due to the nature of the end groups thereon and the core structure is less critical to the advantageous properties described herein.

In one embodiment of the invention the hyperbranched polyester amides of the invention may comprise, as a core structure, a moiety obtained or obtainable from polycondensation reaction between a one or more dialkanol amines and one or more cyclic anhydrides. Optionally further end groups may be attached to the core structure as described herein.

The cyclic anhydride used to prepare the hyperbranched polyester amides of the invention may comprise at least one of: succinic anhydride, $C_1$-$C_{18}$ alkylsuccinic anhydrides, $C_1$-$C_{18}$ alkenylsuccinic anhydrides, polyisobutenylsuccinic anhydride, phthalic anhydride, cyclohexyl-1,2-dicarboxylic anhydride, cyclohexen-3,4-yl-1,2-dicarboxylic anhydride and/or a mixture of two or more thereof.

Another aspect of the present invention provides a composition comprising a hyperbranched polyester amide of the invention as described herein together with a diluent, conveniently water. Preferably the polyester amide is present in the composition in an amount of from 0.1% to 50%, more preferably 0.1% to 10%, and most preferably 0.1% to 5% by weight percentage of the total composition.

Hyperbranched polymers are polymers, which contain a large number of branching sites. Compared to conventional linear polymers which only contain two end groups, hyperbranched polymers possess a large number of end groups, for example on average at least five end groups, preferably on average at least eight end groups per macromolecule. Hyperbranched polyester amides can be produced by polycondensation of dialkanol amines and cyclic anhydrides with optional modification of the end groups, as described in EP1036106, EP1306401, WO 00/58388, WO 00/56804 and/or WO07/098888.

The chemistry of the polyester amides allows the introduction of a variety of functionalities, which can be useful to give the polyester amides other additional properties. Preferred functional end groups comprise (for example are) —OH, —COOH, —NR$_1$R$_2$, where R$_1$ and R$_2$ can be the same or different $C_{1-22}$alkyl, —OCC—R or —COOR, where R is an alkyl or aralkyl group. Other possible end groups are derived from polymers, silicones or fluoropolymers. Still other end groups are derived from cyclic compounds, e.g. piperidine and/or derivatives thereof. Hyperbranched polyester amides with these functionalities may be produced by any suitable method. For example carboxy functional hyperbranched polyester amide polymers are described in WO 2000-056804. Dialkyl amide functional hyperbranched polyester amide polymers are described in WO 2000-058388. Ethoxy functional hyperbranched polyester amide polymers are described in WO 2003-037959. Hetero functionalised hyperbranched polyester amides are described in WO 2007-090009. Secondary amide hyperbranched polyester amides are described in WO 2007-144189. It is possible, and often even desirable, to combine a number of different end group functionalities in a single hyperbranched polyester amide molecule in order to obtain desirable properties of the polymer.

The properties of a hyperbranched polyester amide may be modified by selecting the cyclic anhydride used to build up the polymer structure. Preferred cyclic anhydrides are succinic anhydride, alkylsuccinic anhydrides (where the length of the alkyl chain can vary from $C_1$ to $C_{18}$), alkenylsuccinic anhydrides (where the length of the alkenyl chain can vary from $C_1$ to $C_{18}$), polyisobutenylsuccinic anhydride, phthalic anhydride, cyclohexyl-1,2-dicarboxylic anhydride, cyclohexen-3,4-yl-1,2-dicarboxylic anhydride and other cyclic anhydrides. Especially preferred are succinic anhydride and cyclohexyl-1,2-dicarboxylic anhydride. It is possible to combine more than one type of anhydride to produce a hyperbranched polyester amide with the desired additional properties.

Additionally the anhydride can be partly replaced by the corresponding dicarboxylic acid to obtain the same product as e.g. succinic anhydride can be partly replaced by succinic acid.

In one embodiment the polyester amides of the invention may be obtained by both a cyclic anhydride and a diacid used together in the same process. Preferably the diacid is derived from the cyclic anhydride. A preferred weight percentage for the amount of anhydride is from 1 to 99%, more preferably from 10 to 90%, most preferably from 20 to 80% with respect to the total weight of anhydride and diacid. A preferred weight percentage of diacid is from 1 to 99%, more preferably from 10 to 90%, most preferably from 20 to 80% with respect to the total weight of anhydride and diacid.

The structure and properties of the polyester amides of the invention can be varied over a broad range of polarities and interfacial properties. This makes these hyperbranched polyester amides applicable to solve a variety of problems where water soluble polymers are required at high temperature and/or brine.

A further aspect of the invention broadly provides a use of a polyester amide (preferably hyperbranched polyester amide) in any of the applications described herein (END USES) such as use as a flocculent for example to make paper.

Preferred end uses and/or applications where the polyester amides of the invention may be advantageous are one or more of the following: uses that require polyester amides to remain in solution at elevated temperatures and/or in the presence of salts, as for example applications in the presence of calcium carbonate formation; in geothermal wells for geothermal energy production, cooling towers, cooling water in industrial plants and/or heat exchangers; as flocculants, rheology modifiers and/or dispersants for solid particles in for example paper production, as detergents in for example dishwashers where higher temperature and salts are usually present; material engineering applications; chemical engineering, separation processes (such as extractive distillation, solvent extraction, absorption, membranes and/or chromatography), additives (such as for coatings and/or resins), biotechnical reactor-based processes, formation of functional and/or protective coatings, formation of coatings having low viscosity and/or rapid drying, formation of thin films and/or sensors, formation of nano-sized materials, decontamination and anti-fouling of surfaces, formation of bio-mimetic materials, and/or any suitable combinations of the foregoing (collectively referred to herein as END USES). The polyester amides of the invention may also be useful in biological and/or medical applications (such as gene and/or drug delivery, biomaterials and/or biointeraction).

Hyperbranched polyester amides that may be used in the present invention are water soluble and may be optionally soluble in most organic solvents. A further yet still other aspect of the invention broadly provides for use of polyester amide (preferably hyperbranched polyester amide) as described herein in any of the methods of the invention described herein.

The process of the present invention may use hyperbranched polyester amides alone or in combinations or formulations with other active ingredients as necessitated by specific applications. Examples of other compounds with specific activity are corrosion inhibitors, antifoaming agents, biocides, detergents, rheology modifiers and other functions as made necessary by the application. Application of the hyperbranched polyester amide in the process according to the invention may be as solid or liquid, or dissolved in a solvent which can be chosen by those skilled in the art.

Preferably the polyester amides of and/or used in the present invention are substantially non-linear, branched macromolecules (such as polymers) having three or more polymeric centres, more preferably having a molecular weight of at least 100. Usefully the polyester amides are three dimensional hyperbranched polymers, star-shaped polymers or dendrimeric macro-molecules.

Suitable apolar groups (end groups) may be optionally substituted hydrocarbo groups comprising at least 4 carbon atoms.

Preferred polyester amides of and/or used in the present invention comprise those in which the (average) ratio of polar groups to apolar groups is from about 1.1 to about 20, more preferably from 1.2 to 10, most preferably from 1.5 to 8.0. These ratios may be weight ratios and/or molar ratios, preferably are weight ratios.

Hyperbranched polyester amides of and/or used in the present invention may obtained and/or obtainable from: at least one organo building block and at least one tri (or higher) organo valent branching unit, where the at least one building block is capable of reacting with the at least one branching unit; and at least one or the building block and/or the branching unit (conveniently the branching unit) comprises an end group comprising a polar moiety.

More preferred hyperbranched polyester amides of and/or used in the present invention may be obtained and/or obtainable from: at least one building block comprising one or more polycarboxylic acid(s) and/or one or more anhydride (s) obtained and/or obtainable from one or more polycarboxylic acid(s); and at least one branching unit comprising at least one tri functional nitrogen atom where the at least one branching unit comprises an end group comprising a polar moiety.

Suitable polycarboxylic acid(s) that may be used as and/or to prepare the building block(s) may conveniently be dicarboxylic acids such as $C_{2-12}$ hydrocarbo dicarboxylic acids; more conveniently linear di-acids and/or cyclic di-acids; and most conveniently linear di-acids with terminal carboxylic acid groups such as those selected from the group consisting of: saturated di-acids such as: 2-ethanedioic acid (oxalic acid); 3-propanedioic acid (malonic acid); 4-butanedioic acid (succinic acid), 5-pentanedioic acid (glutaric acid); 6-hexanedioic acid (adipic acid); -heptanedioic acid (pimelic acid); 8-octanedioic acid (suberic acid); combinations thereof; and mixtures thereof; and unsaturated di-acids such as: Z-(cis)-butenedioic acid (maleic acid); E-(trans)-butenedioic acid (fumaric acid); 2,3-dihydroxybutandioic acid (tartaric acid); combinations thereof; and/or mixtures thereof.

Useful hyperbranched polyester amides of and/or used in the present invention may be obtained and/or obtainable from at least one building block that comprises: optionally substituted $C_{2-30}$ hydrocarbo dioic acids and/or anhydrides thereof, combinations thereof on the same moiety; and/or mixtures thereof on different moieties; More useful hyperbranched polyester amides of use in the present invention may be obtained and/or obtainable from at least one building block that comprises: $C_{4-16}$ alkenyl; $C_{2-10}$ dioic anhydrides; $C_{4-16}$ cycloalkyl dicarboxylic acid anhydrides; $C_{2-10}$ alkandioic anhydrides; phthalic anhydrides, combinations thereof on the same moiety and/or mixtures thereof on different moieties.

Most useful hyperbranched polyester amides of use in the present invention may be obtained and/or obtainable from at least one building block that comprises: dodecenyl (i.e. $C_{12}$ alkenyl) succinic (i.e. 4-butanedioic) anhydride; cyclohexane-1,2-dicarboxylic acid anhydride; succinic (i.e. 4-butanedioic) anhydride; combinations thereof on the same moiety; and/or mixtures thereof on different moieties.

Suitable branching units that may be used to prepare hyperbranched polyester amides of and/or used in the present invention may be any moiety capable of reacting with the building block and/or precursor therefor (such as any of those described herein) at three or more sites on the branching unit to form a three dimensional (branched) product.

Branching units denote those units which form the core structure of the hyperbranched polyester amides and do not necessarily form end groups.

Branching units may comprise one or more polyoxyalkylene moiet(ies) comprises polyoxyalkylene repeat unit(s) for example suitable unsubstituted or substituted alkylene groups such as ethylene, propylene, butylene, and isobutylene.

The polyoxyalkylene moiety comprising one or more of these repeat units can be a homo, block or random polymer, or any suitable mixtures thereof. Preferred the average total number of repeat units in polyoxyalkylene moiet(ies) suitable for use in branching units herein is from 2 to 100, more preferably 5 to 60, most preferably 10 to 50, for example 16 or 45.

Suitable neutral end groups may be selected from those described herein, such as quaternary ammonium zwitterionic end groups, i.e. comprising zwitterions that have an anionic group (preferably carboxylate) attached to a positively charged nitrogen atom, more preferably end groups of Formula 1.

Useful functional hyperbranched polyester amides of and/or used in the present invention may be obtained and/or obtainable from:
at least one building block selected from the group consisting of:
  optionally substituted $C_{2-30}$hydrocarbo dioic acid,
  anhydrides thereof;
  combinations thereof on the same moiety; and
  mixtures thereof on different moieties;

More useful hyperbranched polyester amides of use in the present invention may obtained and/or obtainable from:
at least one building block selected from the group consisting of:
  $C_{4-16}$alkenyl $C_{2-10}$dioic anhydride;
  $C_{4-16}$cycloalkyl dicarboxylic acid anhydride;
  $C_{2-10}$alkandioic anhydride;
  combinations thereof on the same moiety; and
  mixtures thereof on different moieties.

The at least one building blocks as described herein may comprise at least one end group selected from the group consisting of:
  quaternised carboxylate $C_{1-12}$hydrocarbo (e.g. $C_{1-6}$hydrocarbylcarboxylate)
  substituted amino
  optionally neutralised carboxylic acid groups;
  optionally substituted nitrogen containing $C_{3-10}$ rings (such as morpholo);
  combinations thereof on the same moiety; and
  mixtures thereof on different moieties.

Most useful functional hyperbranched polyester amides of use in the present invention may obtained and/or obtainable from:
at least one building block selected from the group consisting of:
  dodecenyl (i.e. $C_{12}$alkenyl) succinic (i.e. 4-butanedioic) anhydride;
  cyclohexane-1,2-dicarboxylic acid anhydride;
  succinic (i.e. 4-butanedioic) anhydride;
  combinations thereof on the same moiety; and
  mixtures thereof on different moieties;
at least one branching unit selected from the group consisting of:
  diisopropanol amine; diethanol amine; trishydroxymethylene amino methane;
  combinations thereof on the same moiety; and
  mixtures thereof on different moieties;

where the at least one end group selected from the group consisting of:
  quaternised $C_{1-6}$alkylcarboxylate substituted amino carboxylic acid groups optionally neutralized with ammonia;
  morpholine;
  combinations thereof on the same moiety; and
  mixtures thereof on different moieties.

Advantageously hyperbranched polyester amides of and/or used in the present invention may have a (theoretical) number average molecular weight ($M_n$) of from about 500 to about 50000 g/mol; more advantageously from about 800 to about 30000 g/mol; most advantageously from about 1000 to about 20000 g/mol; even more particularly from about 1200 to about 17000 g/mol.

The end group (or reagents and/or precursors therefore) may be introduced at any stage in the preparation of the polyester amide, though typically is introduced at the beginning.

Specific examples of typical idealized structure of particular preferred hyperbranched polyester amide of and/or used in the present invention are given below.

It will be appreciated that species listed herein as examples of end groups, branching units and/or building blocks include all suitable derivatives and/or precursors thereof as the context dictates. For example if a moiety forms a part of the polyester amide (i.e. is attached to other moieties in macromolecule) reference to compounds also includes their corresponding radical moieties (e.g. monovalent or divalent radicals) that are attached to other moieties forming the polyester amide of the invention.

The terms 'optional substituent' and/or 'optionally substituted' as used herein (unless followed by a list of other substituents) signifies the one or more of following groups (or substitution by these groups): carboxy, sulfo, sulfonyl, phosphates, phosphonates, phosphines, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulfonyl if directly attached to each other represent a sulfamoyl group). Preferred optional substituents comprise: carboxy, sulfo, hydroxy, amino, mercapto, cyano, methyl, halo, trihalomethyl and/or methoxy, more preferred being methyl and/or cyano.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non-carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulfinyl, sulfonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub set of an organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl). Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "$R_2C=$") formed by removing two hydrogen atoms from the same carbon atom of a hydrocarbon, the free valencies of which are engaged in a double bond (for example alkylidene). Hydrocarbylidyne groups comprise trivalent groups (which may be represented by "$RC\equiv$"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies an organo moiety comprising from 1 to N atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Preferably any of the organo groups listed herein comprise from 1 to 36 carbon atoms, more preferably from 1 to 18. It is particularly preferred that the number of carbon atoms in an organo group is from to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cyptands/cryptades, inclusion compounds, intercalation compounds, interstitial compounds, ligand complexes, organometallic complexes, non-stoichiometric complexes, $\pi$ adducts, solvates and/or hydrates); isotopically substituted forms, polymeric configurations [such as homo or copolymers, random, graft and/or block polymers, linear and/or branched polymers (e.g. star and/or side branched), cross linked and/or networked polymers, polymers obtainable from di and/or tri valent repeat units, mono-disperse dendrimers (unless the context herein clearly indicates otherwise), polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polyester amides of the invention may also usefully exhibit other properties to be useful in one or more of the end uses and/or applications described herein. For example the polyester amides of the invention may exhibit at least one of those desired properties described herein and/or any combinations thereof that are not mutually exclusive.

Useful polyester amide(s) of the invention may exhibit one or more improved propert(ies) (such as those described herein) with respect to known polyester amides. More usefully such improved properties may be in a plurality, most usefully three or more of those properties below that are not mutually exclusive.

Conveniently the polyester amide(s) of the invention may exhibit one or more comparable propert(ies) (such as those described herein) with respect to known polyester amides. More usefully such comparable properties may be in two or more, most usefully three or more, for example all of those properties below that are not improved and/or mutually exclusive.

Improved propert(ies) as used herein denotes that the value of one or more parameter(s) of the polyester amides of the present invention is >+8% of the value of that parameter for the reference described herein, more preferably >+10%, even more preferably >+12%, most preferably >+15%.

Comparable properties as used herein means the value of one or more parameter(s) of the polyester amides of the present invention is within +/−6% of the value of that parameter for the reference described herein, more preferably +/−5%, most preferably +/−4%.

The known reference polyester amide for these comparisons is comparative example COMP 1' (prepared as described herein) used in the same amounts (and where appropriate in the same compositions and tested under the same conditions) as polyester amides of the invention being compared.

The percentage differences for improved and comparable properties herein refer to fractional differences between the polyester amide of the invention and the comparative example COMP 1' (prepared as described herein) where the property is measured in the same units in the same way (i.e. if the value to be compared is also measured as a percentage it does not denote an absolute difference).

It is preferred that polyester amides of the invention (more preferably hyperbranched polyester amides) have improved utility in one or more of the END USES described herein (measured by any suitable parameter known to those skilled in the art) compared to the comparative example COMP 1' (prepared as described herein).

Many other variations embodiments of the invention will be apparent to those skilled in the art and such variations are contemplated within the broad scope of the present invention.

Further aspects of the invention and preferred features thereof are given in the claims herein.
Test Methods
Method to Determine Cloud Point For determining the cloud point of the polyester amides the following procedure was followed.

In a 50 ml glass vial was weighted 140 mg of the polymer to which was added water or a brine solution to a total weight of 20 g In the case of amine containing polyester amides the pH was adjusted with 5% w/w HCl solution to obtain the desired pH. A Teflon coated stirrer bar was added to the vial and a thermocouple was immersed in the solution for at least 1 cm, approximately in the middle of the vial. The vial was placed on a stirrer/heater and the temperature was gradually increased while stirring. The solution was observed visually while warming and the cloud point was indicated by the first sign of cloudiness of the solution.
Composition Salt Solution (Also Referred to Herein as BRINE)

For the determination of the cloud point in brine solutions the following salt composition was made.

| | |
|---|---|
| 140 g | Sodium chloride |
| 30 g | Calcium chloride•6H$_2$O |
| 8 g | Magnesium chloride•6H$_2$O |

The salts were dissolved in 1 liter of demineralised water. The pH of the solution was adjusted to 4 (or another desired pH as specified) with 0.1 M hydrochloric acid solution.

EXAMPLES

The present invention will now be described in detail with reference to the following non limiting examples which are by way of illustration only. The below examples comprise preparation of the polyester amides according to the invention in solvent.

Preparation 1A

A 6 L glass reactor, which can be heated by a heating mantle, is fitted with a mechanical stirrer, a Dean Stark distilling trap filled with methylcyclohexane and a nitrogen connection. The reactor is charged with 1037.4 g of diisopropanol amine, 1459.2 g of N,N-bis(N'N'-dimethylaminopropyl) amine and 2268.3 g of hexahydrophthalic anhydride. A gentle nitrogen flow is applied to the glass reactor. The reaction mixture is stirred at 500 rpm and heated to 120° C. This temperature is maintained for 30 minutes. The temperature is increased to 180° C. and the azeotropic distillation starts. Heating is maintained until the residual carboxylic acid content <10 mgKOH/g (titrimetical analysis). The reaction mixture is cooled down to 130° C. and the methylcyclohexane is distilled off by means of vacuum distillation at this temperature. The product obtained is used in the next step.

The product has been characterised as follows: Acid value=9.3 mgKOH/g (titrimetrical analysis), Amine value=183.6 mgKOH/g (titrimetrical analysis), Molecular weight Mw=5200 g/mol.

Preparation 1B

A 3 L glass reactor, which can be heated by a heating mantle, is fitted with a mechanical stirrer, a condenser and a nitrogen connection. The reactor is charged with 450.0 g of the product obtained in preparation 1A and 550.0 g of ethylene glycol. A gentle nitrogen flow is applied to the glass reactor. The mixture is stirred and heated to 80° C. to obtain a solution. 143.9 g of methylchloroacetate is added over a period of one hour. 119.7 g of ethylene glycol is added to the mixture and the mixture is heated to 100° C. This temperature is maintained until the amount of unreacted methylchloroacetate is <50 ppm (determined by H$^1$-NMR). The product is diluted with 56.2 g ethylene glycol to obtain the desired solid contents.

The product has been characterised as follows: Solid contents=44.5 w % (halogen drier @ 160°). Viscosity=1220 mPa·s (23° C.). Example 1.

Preparation 1C

A 3 L glass reactor, which can be heated by a heating mantle, is fitted with a mechanical stirrer, a condenser and a nitrogen connection. The reactor is charged with 500.0 g of the product obtained in preparation 1A and 611.1 g of ethylene glycol. A gentle nitrogen flow is applied to the glass reactor. The mixture is stirred and heated to 80° C. to obtain a solution. 124.3 g of methylchloroacetate is added over a period of one hour. 92.9 g of ethylene glycol is added to the mixture and the mixture is heated to 100° C. This temperature is maintained until the amount of unreacted methylchloroacetate is <50 ppm (determined by H$^1$-NMR). The product is diluted with 59.0 g ethylene glycol to obtain the desired solid contents.

The product has been characterised as follows: Solid contents=46.0 w % (halogen drier @ 160°). Viscosity=1430 mPa·s (23° C.). Example 2

Preparation 1D

In a 1 L PE jar, 625.0 g of the product obtained in preparation 1C is mixed with 43.4 g of citric acid and 67.0 g of ethylene glycol. The mixture is shaken until it is homogeneous.

The product has been characterised as follows: Solid contents=45.0 w % (calculated). Viscosity=1425 mPa·s (23° C.). Example 3.

Preparation 1E

In a 1 L PE jar, 595.0 g of the product obtained in preparation 1C is mixed with 63.6 g of choline dihydrogen-citrate and 90.9 g of ethylene glycol. The mixture is shaken until it is homogeneous.

The product has been characterised as follows: Solid contents=45.0 w % (calculated). Viscosity=1005 mPa·s (23° C.). Example 4.

Preparation 2A

A 3 L glass reactor, which can be heated by a heating mantle, is fitted with a mechanical stirrer, a distillation head and a vacuum and nitrogen connection. The reactor is charged with 207.1 g diisopropanol amine and 437.0 g of N,N-bis(N'N'-dimethylaminopropyl) amine. The reactor is heated to 40° C. and 892.5 g of dodecenyl succinic anhydride is added. The mixture is heated to 160° C. and this temperature is maintained for 1 hour. Then, the pressure is gradually reduced to a final pressure of <10 mbar to remove reaction water. Heating and vacuum were maintained until the residual carboxylic acid content is <8 mgKOH/g (titrimetrical analysis) to obtain a product used in the next step.

The product has been characterised as follows: Acid value=5.5 mgKOH/g (titrimetrical analysis), Amine value=158.6 mgKOH/g (titrimetrical analysis), Molecular weight Mw=3500 g/mol.

Preparation 2B

A 500 mL glass reactor, which can be heated by a heating mantle, is fitted with a mechanical stirrer, a condenser and a nitrogen connection. The reactor is charged with 150.0 g of the product obtained in preparation 2A and 183.3 g of ethylene glycol. A gentle nitrogen flow is applied to the glass reactor. The mixture is stirred and heated to 80° C. to obtain a solution. 41.4 g of methylchloroacetate is added over a period of one hour. 32.5 g of ethylene glycol is added to the mixture and the mixture is heated to 100° C. This temperature is maintained until the amount of unreacted methylchloroacetate is <50 ppm ($H^1$-NMR). The product is diluted with 18.1 g ethylene glycol to obtain the desired solid contents.

The product has been characterised as follows: Solid contents=41.0 w % (halogen drier @ 160°). Example 5.

Preparation 3A

A 6 L glass reactor, which can be heated by a heating mantle, is fitted with a mechanical stirrer, a Dean Stark distilling trap filled with methylcyclohexane and a nitrogen connection. The reactor is charged with 967.5 g of diisopropanol amine, 1597.5 g of N,N-bis(N'N'-dimethylaminopropyl) amine and 2190.9 g of hexahydrophthalic anhydride. A gentle nitrogen flow is applied to the glass reactor. The reaction mixture is stirred at 500 rpm and heated to 120° C. This temperature is maintained for 30 minutes. The temperature is increased to 180° C. and the azeotropic distillation starts. Heating and distallation is maintained until the residual carboxylic acid content <10 mgKOH/g (titrimetical analysis). The reaction mixture is cooled down to 130° C. and the methylcyclohexane is distilled off by means of vacuum distillation at this temperature. The product obtained is used in the next step.

The product has been characterised as follows: Acid value=7.8 mgKOH/g (titrimetrical analysis), Amine value=197.7 mgKOH/g (titrimetrical analysis), Molecular weight Mw=2900 g/mol.

Preparation 3B

A 3 L glass reactor, which can be heated by a heating mantle, is fitted with a mechanical stirrer, a condenser and a nitrogen connection. The reactor is charged with 500.0 g of the product obtained in preparation 3A and 541.7 g of ethylene glycol. A gentle nitrogen flow is applied to the glass reactor. The mixture is stirred and heated to 80° C. to obtain a solution. 133.6 g of methylchloroacetate is added over a period of one hour. 92.2 g of ethylene glycol is added to the mixture and the mixture is heated to 100° C. This temperature is maintained until the amount of unreacted methylchloroacetate is <50 ppm (determined by $H^1$-NMR). The product is diluted with 56.2 g ethylene glycol to obtain the desired solid contents.

The product has been characterised as follows: Solid contents=53.1 wt % (halogen drier @ 160°). Viscosity=3470 mPa·s (23° C.). Example 6.

Preparation 4A

A 3 L double walled glass reactor, which can be heated by circulating hot oil, is fitted with a mechanical stirrer, a connection connected to a vacuum pump and a nitrogen connection. A gentle nitrogen flow is applied to the glass reactor. The reactor is warmed to 80° C. and charged with 131.6 g of diisopropanol amine, 185.0 g of N,N-bis(N'N'-dimethylaminopropyl) amine. 220.0 g of hexahydrophthalic anhydride is slowly added over a period of 25 minutes. The reaction mixture is stirred at approximately 300 rpm. This temperature is maintained at 80° C. for 10 minutes and 263.4 of polyethylene glycol biscarboxymethylene ether with average molecular weight of 600 is added. The temperature is increased to 170° C. and the pressure is gradually reduced to 50 mbar over a period 9 hrs. Heating and vacuum is maintained until the residual carboxylic acid content <10 mgKOH/g (titrimetical analysis). The product obtained is used in the next step.

The product has been characterised as follows: Acid value=10.2 mgKOH/g (titrimetrical analysis), Amine value=115.3 mgKOH/g (titrimetrical analysis), Molecular weight Mw=7000 g/mol.

Preparation 4B

A 1 L glass reactor, which can be heated by a heating mantle, is fitted with a mechanical stirrer, a condenser and a nitrogen connection. The reactor is charged with 91.5 g of the product obtained in preparation 4A and 111.8 g of ethylene glycol. A gentle nitrogen flow is applied to the glass reactor. The mixture is stirred and heated to 100° C. to obtain a solution. 12.6 g of methylchloroacetate is added. An additional 22.5 g of ethylene glycol is added to the mixture and the mixture is stirred at 100° C. This temperature is maintained until the amount of unreacted methylchloroacetate is <50 ppm (determined by $H^1$-NMR). The product is diluted with 10.4 g ethylene glycol to obtain the desired solid contents.

The product has been characterised as follows: Solid contents=45.8 wt % (halogen drier @ 160°). Viscosity=512 mPa·s (23° C., 2.5 rpm). Example 7.

Preparation 5A

A 1 L double walled glass reactor, which can be heated by a heating mantle, is fitted with a mechanical stirrer, a connection connected to a vacuum pump and a nitrogen connection. A gentle nitrogen flow is applied to the glass reactor. The reactor is charged with 142.5 g hexahydrophthalic anhydride and 297.2 g of polyethyleneglycol monomethyl ether with average molecular weight of 750 g/mol. The reaction mixture is stirred at 500 rpm and heated to 80° C. This temperature is maintained for 30 minutes. Than the reactor is charged with 7.5 g of morpholine and stirred for 10 minutes. 52.8 g of diisopropanolamine and 34.4 g of 1-methylpiperazine is added. The temperature is increased to 120° C. stirred for 1 hour. Than the temperature is increased to 170° C. which is maintained for 1 hour. The pressure is gradually reduced with approximately 50 mbar each 5 minutes until full vacuum is reached. This is maintained until the residual carboxylic acid content <10 mgKOH/g (titrimetical analysis). The product obtained is used in the next step.

The product has been characterised as follows: Acid value=8.4 mgKOH/g (titrimetrical analysis), Amine value=36.8 mgKOH/g (titrimetrical analysis), Molecular weight Mw=3800 g/mol.

Preparation 5B

A 370 mL glass reactor, which can be heated by a hot water bath, is fitted with a gneticl stirrer. The reactor is charged with 200 g of a 50 wt % solution of the product obtained in 5A in 2-butoxyethanol and 6.4 g methyl chloroacetate is added. The mixture is stirred at 80° C. for 20 hours to obtain the final product of example 8.

Comparative A:

A double walled glass reactor, which can be heated by means of thermal oil, fitted with a mechanical stirrer, a distillation head, a vacuum and nitrogen connection, is charged with 192.5 g of succinic anhydride. The reactor was heated to 125° C. When the succinic anhydride has melted 307.5 g of diisopropanol amine was added. The reaction mixture was stirred for 1 hour and then the temperature was raised to 160° C. Over a period of 4 hours the pressure was gradually reduce to a final pressure of <10 mbar to distil off reaction water. Heating and vacuum were maintained until the residual carboxylic acid content was <0.2 meq/g (tritrimetrical analysis). Molecular weight Mn=1200. AV=5.2 mgKOH/g Comparative B A double walled glass reactor, which can be heated by means of thermal oil, fitted with a mechanical stirrer, a distillation head, a vacuum and nitrogen connection, is charged with 245.5 g of hexahydrophthalic anhydride. The reactor was heated to 80° C. When the anhydride has melted 254.5 g of diisopropanol amine was added. The reaction mixture was stirred for 1 hour and then the temperature was raised to 160° C. Over a period of 4 hours the pressure was gradually reduce to a final pressure of <10 mbar to distil off reaction water. Heating and vacuum were maintained until the residual carboxylic acid content was <0.2 meq/g (tritrimetrical analysis). Molecular weight Mn=1500. AV=6.4 mgKOH/g.

| | Cloud point (° C.) | |
|---|---|---|
| Compound from example | DMW | BRINE |
| 1 | >100 | >100 |
| 2 | >100 | >100 |
| 3 | >100 | >100 |
| 4 | >100 | >100 |
| 5 | >100 | >100 |
| 6 | >100 | >100 |
| 7 | nd | 67 |
| 8 | 91 | 37 |
| Comp A | 84 | 14 |
| Comp B | Insoluble | Insoluble |

The invention claimed is:

1. A hyperbranched polyester amide, wherein the hyperbranched polyester amide comprises at least one end group thereon represented by Formula 1:

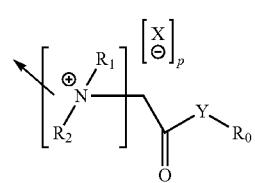

(Formula 1)

wherein the arrow denotes a point of attachment to the hyperbranched polyester amide from the Formula 1 group;

$R_0$ denotes optionally substituted $C_{1-20}$hydrocarbo, and

Y denotes $NR_a$ or O where $R_a$ is H or optionally substituted $C_{1-20}$hydrocarbo, and wherein when Formula 1 is a zwitterion, one or more of the groups $R_0$, $R_1$ and $R_2$ comprise a suitable amount of negative charge to balance the nitrogen cation, p is 0 and $X^-$ is absent; or wherein groups $R_0$, $R_1$ and $R_2$ are neutral groups, then $X^-$ represents an anion and p is a suitable integer to balance the nitrogen cation; and $R_1$ and $R_2$ independently denote optionally substituted $C_{1-20}$hydrocarbo groups or together with the nitrogen to which they are attached form in whole or in part a cyclic moiety comprising up to 20 C atoms and optionally one or more hetero atoms.

2. The hyperbranched polyester amide as claimed in claim 1, wherein $R_0$ is a $C_{1-20}$hydrocarbo substituted by one or more hetero atom.

3. The hyperbranched polyester amide as claimed in claim 1, which has a cloud point of at least 50° C.

4. The hyperbranched polyester amide as claimed in claim 1, wherein the hyperbranched polyester amide has a cloud point of at least 75° C., and the at least one end group thereon comprises at least one zwitterion that has an anionic carboxylate ester attached to a positively charged nitrogen atom.

5. The hyperbranched polyester amide as claimed in claim 1, wherein the hyperbranched polyester amide has a cloud point of at least 80° C., and wherein the at least one end group is represented by Formula 1a:

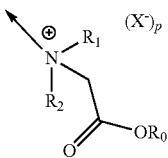

(Formula 1a)

wherein $R_1$ and $R_2$ independently denote optionally substituted $C_{1-6}$hydrocarbo groups.

6. The hyperbranched polyester amide as claimed in claim 1, wherein in $R_1$ and $R_2$ independently denote $C_{1-4}$hydrocarbyl groups.

7. The hyperbranched polyester amide as claimed in claim 6, wherein in $R_1$ and $R_2$ independently denote methyl.

8. The hyperbranched polyester amide as claimed in claim 1, wherein the hyperbranched polyester amide comprises cationic functional groups thereon and at least one carboxylate counter anion obtained from at least one organic carboxylic acid or salt thereof.

9. The hyperbranched polyester amide as claimed in claim 8, wherein the at least one carboxylate counter anion is obtained from citric acid or an acid salt thereof.

10. The hyperbranched polyester amide as claimed in claim 1, which comprises a core obtained from hexahydrophthalic anhydride.

11. The hyperbranched polyester amide as claimed in claim 1, which has a cloud point of at least 100° C. in BRINE.

12. The hyperbranched polyester amide as claimed in claim 1, which comprises a core obtained from at least one hexahydrophthalic anhydride, at least one cationic end group and at least one citrate counter anion, and wherein the hyperbranched polyester amide has a cloud point of at least 100° C. in BRINE.

13. The hyperbranched polyester amide as claimed in claim 1, wherein p is 1 if X has a single negative charge.

14. A flocculent composition which comprises the hyperbranched polyester amide as claimed in claim 1 and a diluent.

15. A method of flocculating a material dispersed in an aqueous medium comprising the steps of:
(a) providing an aqueous dispersion of a material dispersed in an aqueous medium, and
(b) adding to the aqueous dispersion a sufficient amount of the hyperbranched polyester amide as claimed in claim 1 so as to flocculate the material dispersed in the aqueous medium.

* * * * *